United States Patent [19]

Breslin

[11] Patent Number: 5,527,055
[45] Date of Patent: Jun. 18, 1996

[54] HITCH-UTILITY ITEM COUPLING DEVICE

[75] Inventor: Patrick W. Breslin, Wickenburg, Ariz.

[73] Assignee: U-Haul International, Inc., Tempe, Ariz.

[21] Appl. No.: 281,849

[22] Filed: Jul. 28, 1994

[51] Int. Cl.[6] ..................................................... B60D 1/04
[52] U.S. Cl. ...................... 280/504; 280/507; 280/511; 403/3
[58] Field of Search .................... 403/3, 362, 379; 280/504, 506, 507, 511

[56] References Cited

U.S. PATENT DOCUMENTS

| 4,301,953 | 11/1981 | Abbott | 280/511 |
| 4,620,718 | 11/1986 | Mickelson | 280/507 |
| 4,989,892 | 2/1991 | Kerins et al. | 280/504 |
| 5,169,168 | 12/1992 | Harry et al. | 280/511 |
| 5,184,840 | 2/1993 | Edwards | 280/507 |
| 5,186,483 | 2/1993 | Sheppard | 280/494 |

FOREIGN PATENT DOCUMENTS 2458948  6/1976  Germany.

*Primary Examiner*—Mitchell J. Hill
*Attorney, Agent, or Firm*—Jeffer, Mangels, Butler & Marmaro

[57]  ABSTRACT

A coupling system for attaching a utility item to a vehicle trailer hitch is disclosed. The system provides improved ease of attachment and removal of the utility item to the vehicle trailer hitch. Further, the system allows access to the rear of the vehicle without removal of the utility item from the trailer hitch. The system design also provides reduced movement between the trailer hitch and the utility item.

11 Claims, 4 Drawing Sheets

5,527,055

HITCH-UTILITY ITEM COUPLING DEVICE

BACKGROUND OF THE INVENTION

The present invention relates generally to utilizing vehicle trailer hitches for functions other than trailer towing. Specifically, the invention relates to a coupling device for connecting utility items to a trailer hitch.

It is often the case that when one is not using one's trailer hitch to pull a load, one might use the hitch in other manners. By way of example, one might connect a bike rack or a ski rack to the hitch.

Currently, the available options for connecting a utility item to a trailer hitch include first connecting a shank to the bottom of the utility item. The shank is then engaged with a receiver hitch attached to the vehicle. A disadvantage of this method is that different shank sizes and shapes must be available to accommodate different sized hitches. In addition, this method does not allow for connection to a "fixed tongue" hitch.

Another available option includes attaching a "foot" to the bottom of the utility item. This "foot" can sit on or below either the tongue of a receiver hitch ball mount or the tongue of a fixed tongue hitch. The "foot", and thereby the utility item, is held in place by the hitch ball assembly. This method, however, requires removal and reattachment of the entire ball assembly in order to install and remove the utility item. This entails substantial time and effort each time the utility item is either put into place or removed.

Yet another option includes attaching a tube to the utility item. This tube is then lowered onto a stem assembly, which is attached to the trailer hitch. A nut/bolt combination is then used to secure the utility item/tube to the stem assembly. This method allows slight horizontal and vertical movement by the utility item mounting tube due to the tolerances required in order to allow the mounting tube to be attached and removed without difficulty. These slight movements at the connection point translate into large movements of the utility item at its top and also tend to create rattling noises.

Still another device includes a utility item which is designed to receive a shaft in a lower portion of the item, wherein the shaft is substituted for a mounting ball or stem which is normally attached to the trailer hitch. The utility item is then slidably engaged with the shaft and the shaft is locked in place relative to the utility item. Again, this device will result in movement by the utility item due to necessary tolerances. Additionally, this method is time consuming in that each time a utility item is to be attached, the mounting ball or stem which is normally attached to the hitch for towing must be removed and the shaft for the utility item must be connected. The same process, but in reverse, must be performed when one subsequently wishes to tow a load.

To date, there is not available a universal bolt-on hitch utility item connection method which does not require removal of the hitch stem to install the utility item and which can eliminate movement and rattling noise created by the securing device.

SUMMARY OF THE INVENTION

An object of the present invention is to provide a device which allows for quick and easy attachment of a utility item to a vehicle.

Another object of the present invention is to provide a device which attaches to a trailer hitch without having to remove a trailer hitch stem assembly.

Another object of the present invention is to provide a device which fixes the utility item such that movement between the device and utility item and any resultant rattling noise is eliminated.

Another object of the present invention is to provide a device which allows the utility item to be easily moved to allow access to the rear of the vehicle.

The present invention relates to a device for coupling a utility item to a trailer hitch. A device is provided which reduces the time and energy required to connect a utility item to a trailer hitch. The present invention provides a device which engages a trailer hitch stem assembly at a lower portion of the device and receives a utility item in an upper portion of the device. The lower portion also provides for locking the device to the stem assembly in a manner which reduces movement and rattling noise. The upper portion is designed to allow the utility item to lock into the device or allow the utility item to rotate, while still connected to the device, in a manner such that one could access the rear of the vehicle.

DESCRIPTION OF THE PREFERRED EMBODIMENTS

The present invention may work in conjunction with a previously patented item, namely U.S. Pat. No. 4,596,406, which is described as a hitch ball apparatus (hereinafter referred to as the '406 device). The '406 device is a device for connecting a towing vehicle to a trailer. The '406 device utilizes a standard sized stem assembly. The stem assembly is fixably connected to a trailer hitch. The '406 device is able to adapt to various trailer couplers by providing changeable top or ball portions. The ball portions all have various exterior sizes but also have standard bores for engaging a standard stem assembly. Because the '406 device provides a standard stem assembly which allows for attaching objects, the '406 device is well suited for the present device. When utilizing the '406 device stem in conjunction with the coupler of the present invention, one may attach a utility item without removing the stem assembly from the trailer hitch. This will be described in more detail below. The use of the present invention is not limited to use with the '406 device. The present invention may be used with any device which provides a stem and adequate means for fixing the stem to the present invention, as described below.

Figure 2:
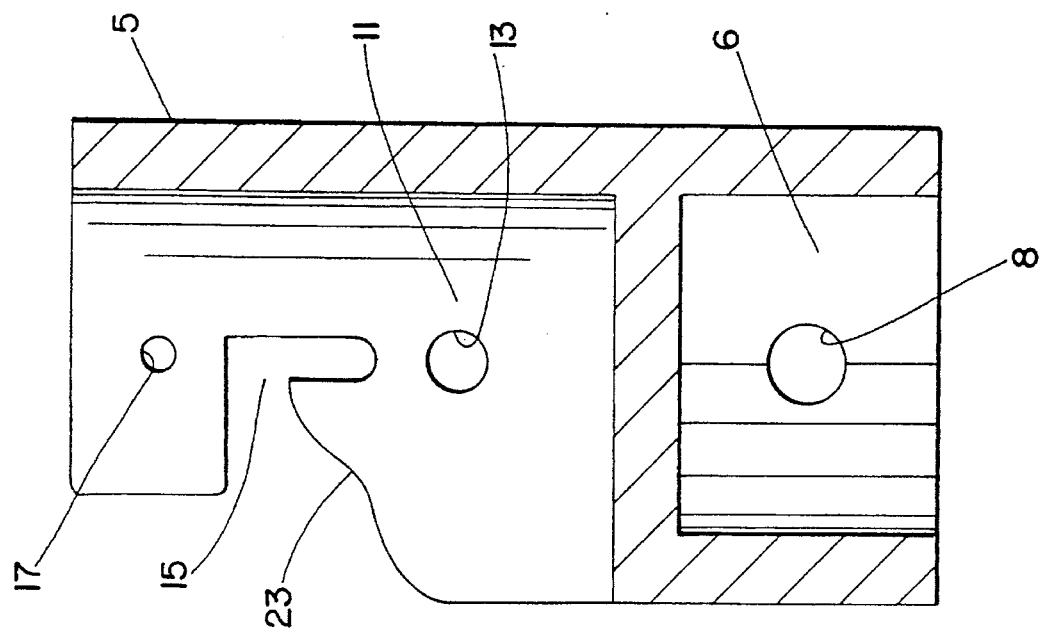
FIG. 2 is a right side cross-sectional view of the coupling device of FIG. 1.
Figure 1:
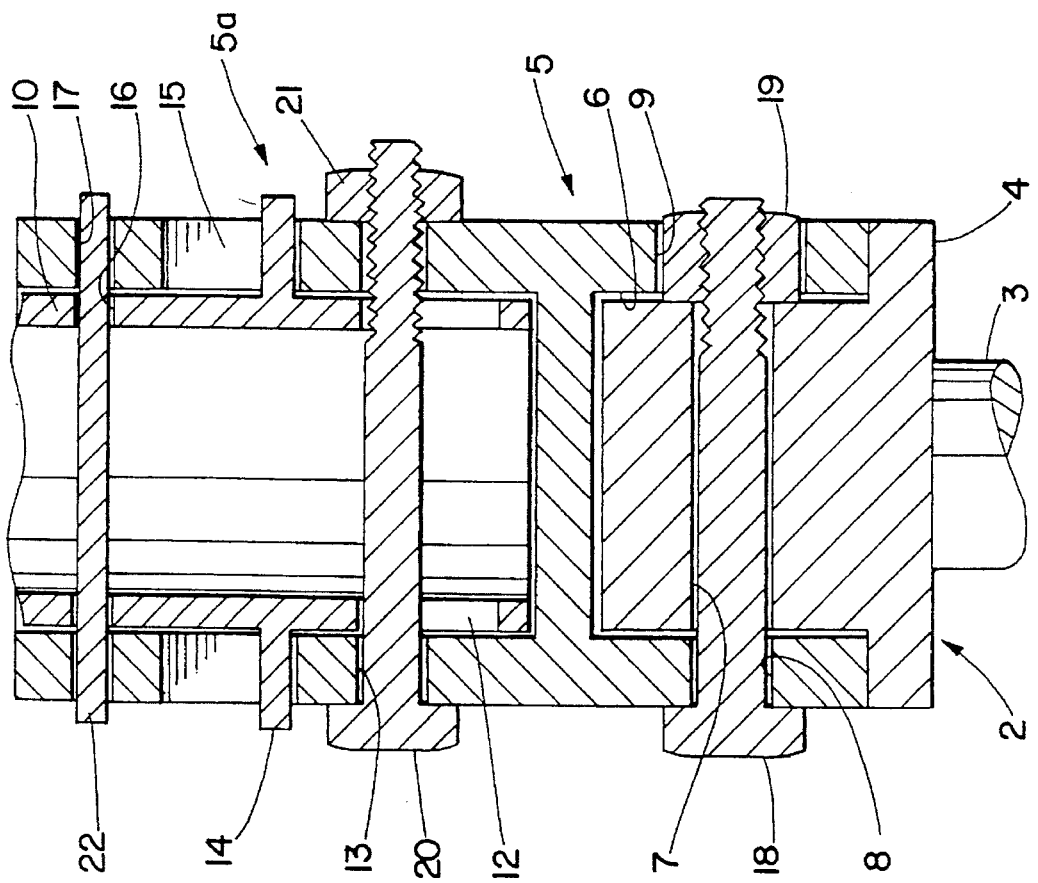
FIG. 1 is a front cross-sectional view of a coupling device engaged with a stem assembly and a utility item according to the invention.

Referring now to the drawings, there is illustrated in FIG. 1 an embodiment in accordance with the principles of the present invention. A stem assembly, generally at 2, has a shank 3 and a stem 4. The shank 3 engages and affixes to a trailer hitch (30 (see FIGS. 7–8)), as for example by screwing into a trailer hitch tongue 31. A coupling device or coupler 5 is formed to define a recess in a lower portion of coupler 5, generally at 6, as is illustrated in FIG. 2. The stem 4 and recess 6 of the lower portion are of complementary shapes such that stem 4 and recess 6 form a piece with minimal play therebetween when engaged. By way of example and not limitation, in a preferred embodiment, the shape of stem 4 and recess 6, in a horizontal plane, is round.

As is illustrated in FIG. 1, stem 4 is engaged with coupler 5 at recess 6. Further, stem 4 may comprise a through bore 7 which is substantially horizontal. The lower portion of coupler 5 is also formed to define through openings 8 and 9. These openings are formed on opposite sides of recess 6 such that they align with through bore 7. In a preferred embodiment, stem 4 is fixed in a position within recess 6 by locking means, as for example a nut/bolt combination wherein a bolt 18 engages coupler 5 at opening 8, engages stem 4 at through bore 7 and exits coupler 5 at opening 9. The bolt 18 comprises a head which is larger than opening 8 and contacts the outer surface of coupler 5 in the vicinity of the opening 8. A nut 19, such as a tall nut, is utilized which fits into opening 9 and when nut 19 is screwed to tighten the nut/bolt combination, nut 19 contacts stem 4. By contacting stem 4, nut 19 acts to fix the position of stem 4, relative to coupler 5, in an excellent manner. As nut 19 is tightened, stem 4 is pressed against an interior wall of the lower portion of coupler 5, thereby providing a stabilizing support for coupler 5. Movement between coupler 5 and stem assembly 2 is effectively eliminated. As such, the utility item which is to be attached to coupler 5, as described below, will realize reduced movement and therein reduced rattling.

Figure 3:
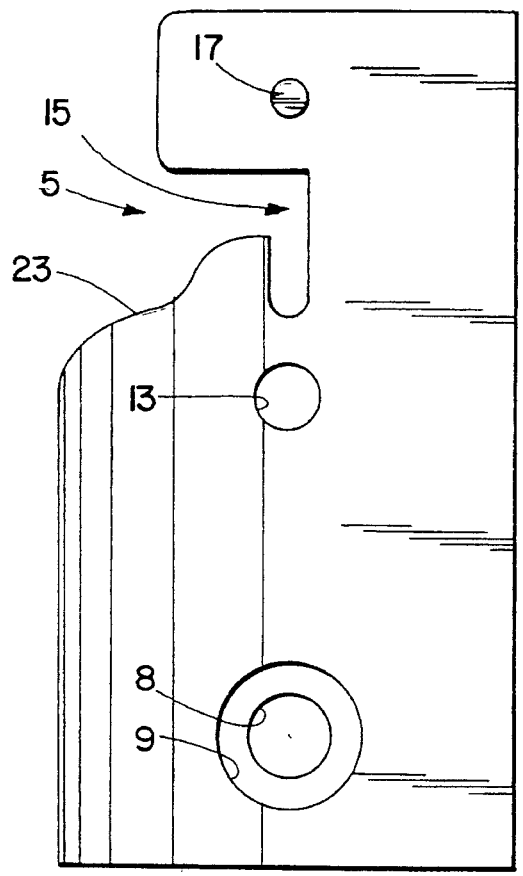
FIG. 3 is a right side elevational view of the coupling device of FIG. 1.
Figure 4:
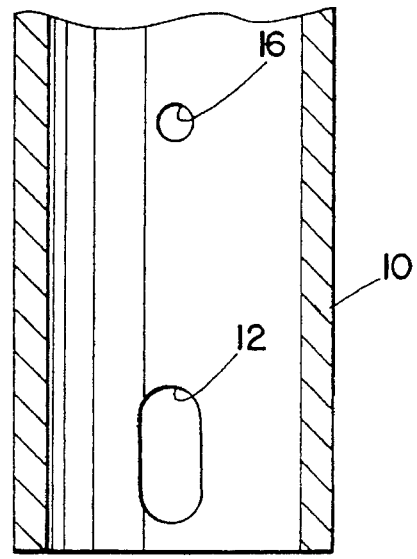
FIG. 4 is a side cross-sectional view of a utility item mounting tube.
Figure 5:
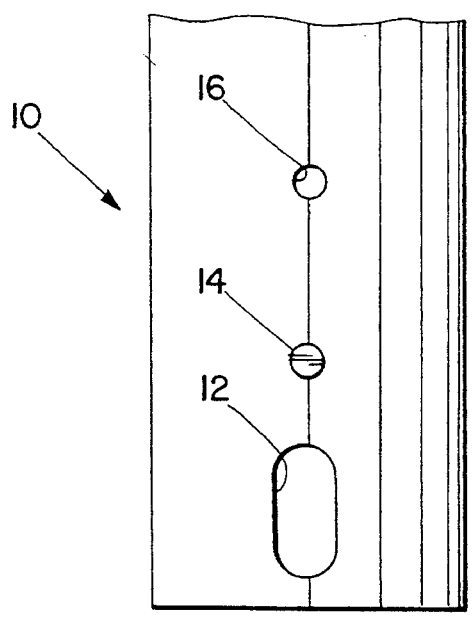
FIG. 5 is a side elevational view of the utility item mounting tube of FIG. 4.
Figure 6:
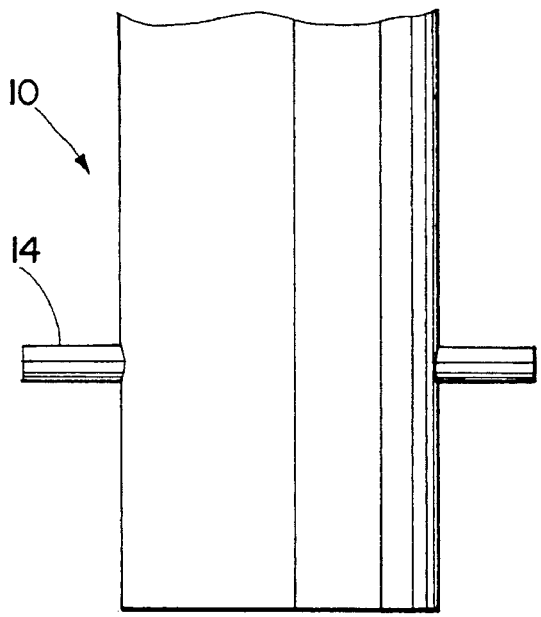
FIG. 6 is a front elevational view of the utility item mounting tube of FIG. 4.

Referring again to the drawings, the relationship between coupler 5 and a utility item, generally at 10, in a preferred embodiment, will now be described. As is illustrated in FIGS. 1 and 2, coupler 5 has an upper portion 59. The upper portion is formed such that it has generally three sides, the three sides forming a recess 11. The utility item has a mounting tube, also generally at 10, which engages coupler 5 at recess 11. By way of example and not limitation, in a preferred embodiment the shape of the recess 11 is square in a horizontal plane and the shape of the mounting tube 10 is round in a horizontal plane. The mounting tube 10 is formed to define vertically slotted openings 12 formed near the bottom of and on opposite sides of the tube 10. The coupler 5 is formed to define openings 13 on opposite sides of recess 11, such that when mounting tube 10 is engaged in recess 11, openings 13 align with the top of slotted openings 12. The mounting tube 10 is further formed to define horizontal positioning pins 14. As illustrated in FIGS. 2 and 3, coupler 5 is further formed to define slotted openings 15 which are formed to receive positioning pins 14 when mounting tube 10 is engaged in recess 11. The slotted openings 15 are also formed such that when mounting tube 10 is raised and rotated forward, positioning pins 14 are able to escape slotted openings 15 (forward is a counterclockwise direction in FIGS. 2 and 3). The mounting tube 10 is further formed to define openings 16. The coupler 5 is further formed to define openings 17, which align with openings 16 when mounting tube 10 is engaged in recess 11. In operation, when the utility item is in use, locking means, as for example a pin 22, is inserted into openings 16 and 17 to lock mounting tube 10 into position relative to coupler 5.

When utility item 10 is to be used, coupler 5 is engaged with stem assembly 2, such as one described in the '406 patent, which is already attached to a trailer hitch (not shown). The coupler 5 is locked to stem assembly 2 by way of nut/bolt combination 18, 19. The coupler 5 is designed such that nut 19 of the nut/bolt combination is able to engage stem 4 and urge stem 4 into contact with coupler 5.

Once coupler 5 is attached to stem 4, installation of utility item 10 is quick and easy. The utility item 10 is connected to coupler 5 by placing utility item mounting tube 10 into recess 11 of the upper portion of coupler 5. A fixing member, such as a nut/bolt combination 20, 21 is inserted into first pair of openings 13 formed in the upper portion and into mounting tube slotted openings 12. This will allow utility item 10 to rotate forwards and backwards (in FIG. 1, into and out of the page also FIG. 8). This will also allow utility item 10 to be raised and/or lowered when it is in a vertical position.

Figure 7:
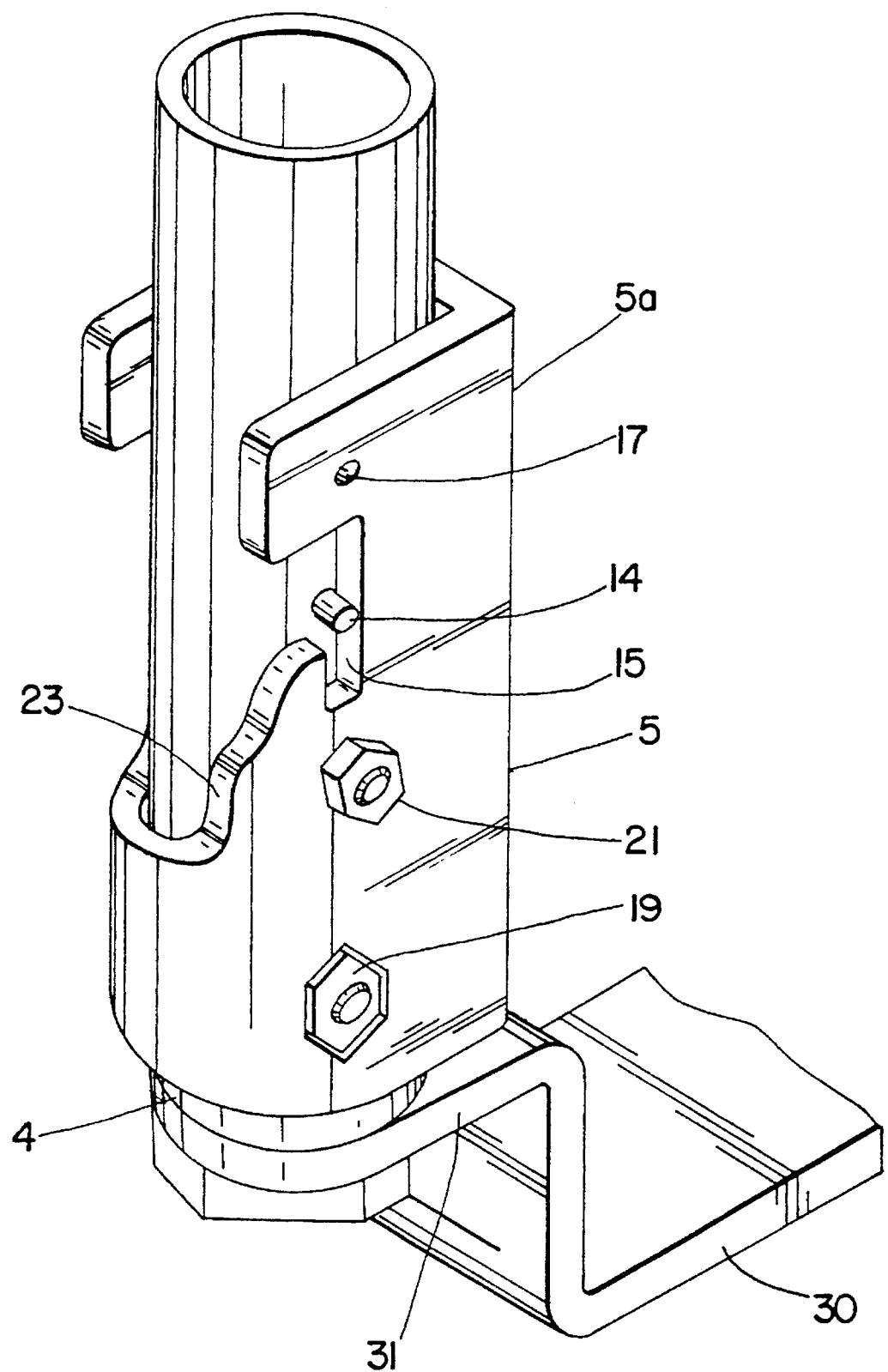
FIG. 7 is a left perspective view of an embodiment of a trailer hitch coupling system of the invention including a coupler main housing, a trailer hitch stem assembly and a utility item, with the utility item including a column portion in a first, upright position.
Figure 8:
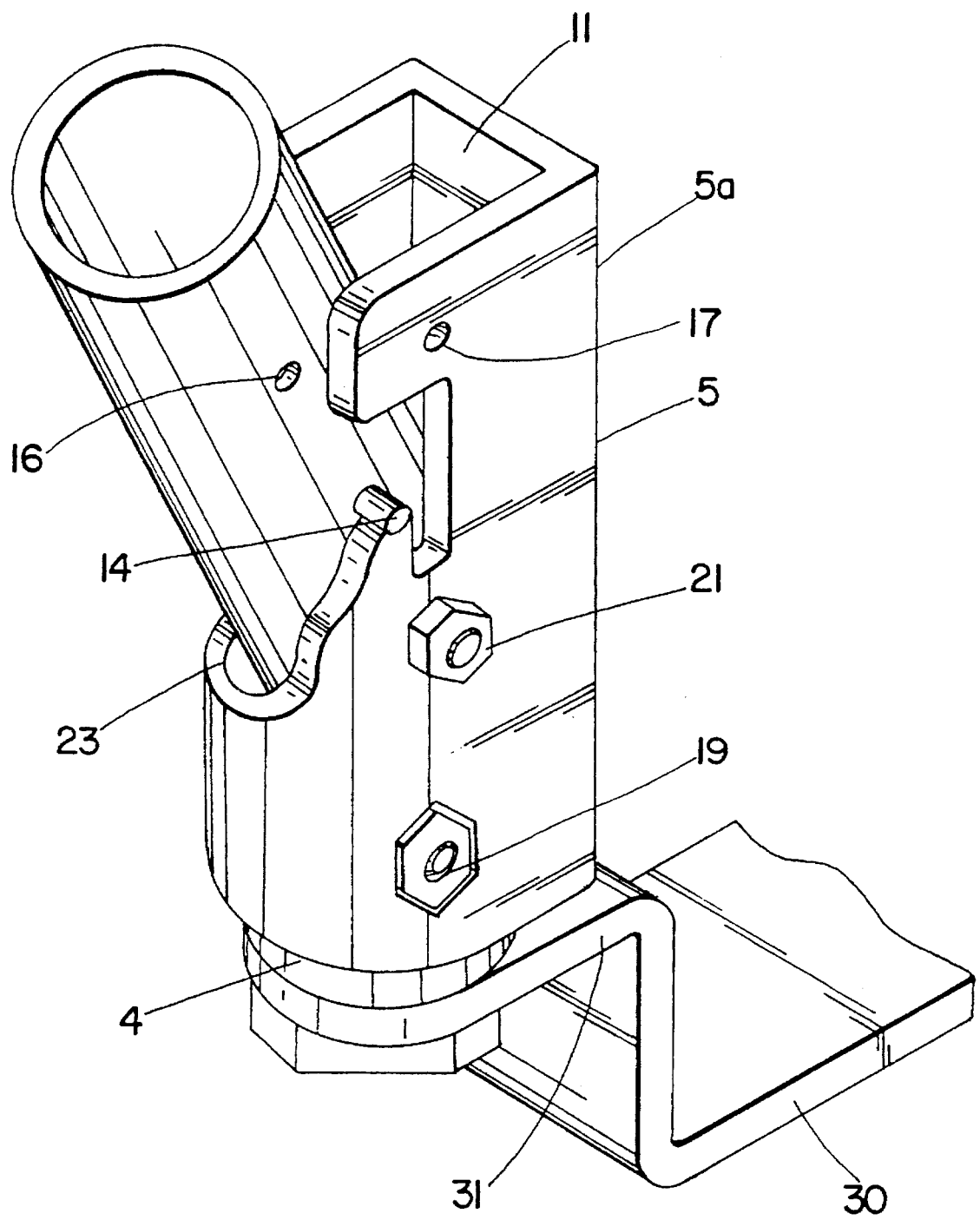
FIG. 8 is a left perspective view of the embodiment of FIG. 7 with the column portion in a second, forwardly rotated position.

Once connected to coupler 5, the utility item may be placed in one of two positions. The first position of for traveling and the second position is to allow access to the rear of a vehicle. To place mounting tube 10 in the first position, mounting tube 10 is raised so that bolt 20 is at the lowest point of slotted opening 12. The mounting tube 10 is then rotated so that it is in a vertical position and positioning pins 14 enter slots 15 (FIG. 7). The mounting tube 10 is then lowered so that positioning pins 14 are at the lowest point of slots 15 and bolt 20 is at the highest point of slots 12. Further, coupler openings 17 and mounting tube openings 16 should be aligned such that a locking means such as a locking pin 22 could be inserted.

To place utility item 10 in the second position, locking means such as locking pin 22 must be removed. The mounting tube 10 is raised and the utility item is merely rotated forward. The positioning pins 14 are received by a detent 23 formed in the upper portion of the coupler main housing 5. This detent 23 provides a resting place for the utility item when it is in the second position.

In order to remove the utility item 10, the nut/bolt combination 20, 21 is removed and utility item 10 is removed from the recess 11.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A coupler for coupling a utility item to a trailer hitch, said coupler having a front side and a back side, said coupler comprising:

(i) an upper portion having a lower end, said upper portion having defined therein a recess for receiving a utility item mounting tube, said recess having two opposite sides, said opposite sides of said recess having defined therein (a) a first pair of horizontal openings at said lower end of said upper portion, one of said pair being defined in each of said opposite sides of said recess, wherein said openings are aligned with one another, (b) a pair of slotted openings, one of said pair being defined in each of said opposite sides of said recess and above one of said first pair of openings wherein said slotted openings are accessible from said front of said coupler, and (c) a second pair of horizontal openings, one of said pair being defined in each of said opposite sides of said recess and above one of said slotted openings; and (ii) a lower portion, said lower portion having first and second opposite surfaces, said lower portion having defined therein (a) a recess for receiving a stem of a trailer hitch assembly, said recess having a shape substantially complementary to said stem assembly, and (b) first and second horizontal openings in said first end second surfaces, wherein said first and second openings are aligned with one another.

2. A coupler as claimed in claim 1, wherein said second horizontal opening of said lower portion is larger than said first horizontal opening.

3. A device comprising (a) a coupler as claimed in claim 2, and (b) a trailer hitch assembly comprising (i) a stem engaged with said lower portion recess, said stem having a horizontal through bore which aligns with said first and second openings of said lower portion when said stem is engaged with said lower portion recess; and (ii) means for locking said stem in place within said lower portion.

4. A device as claimed in claim 3, wherein said means for locking comprises (1) a cross member which extends through said through bore and first opening and at least partly into said second opening and has a first end and a second end, said first end having a head which contacts said lower portion substantially around said first opening, and (2) a nut secured to said second end of said cross member, said nut fitting within said second opening and contacting said stem of said trailer hitch assembly.

5. A coupling device comprising (a) a coupler as claimed in claim 1, and (b) a utility item comprising (i) an elongate mounting tube, said mounting tube being engaged with said recess defined in said upper portion, said mounting tube having defined therein a first pair of vertically slotted openings, wherein said vertically slotted openings are aligned with said first pair of horizontal openings in said upper portion of said coupler and a second pair of horizontal openings which are aligned with said second pair of horizontal openings of said upper portion of said coupler, said mounting tube further comprising a pair of horizontal positioning pins which engage said slotted openings of said upper portion of said coupler; and (ii) means for locking said mounting tube in place within said upper portion of said coupler.

6. A trailer hitch coupling system comprising:

a coupler having an upper portion and a lower portion, wherein said lower portion has two opposite surfaces and has defined thereinbetween a recess having an open side;

a trailer hitch stem assembly comprising a stem which is slidably engagable into said lower portion recess, wherein said recess and said stem are of complementary shapes; and locking means for fixing said stem assembly to said coupler.

7. A system as claimed in claim 6 further comprising a utility item, said item comprising a column portion capable of assuming a first, upright position and a second, forwardly rotated position, wherein said upper portion of said coupler comprises means for receiving said column portion.

8. A system as claimed in claim 7, wherein said receiving means comprise a recess formed in said upper portion of said coupler, said recess being open on one side.

9. A system as claimed in claim 7, wherein said upper portion of said couple further comprises means for locking said column portion to said coupler, and means for positioning said column portion so that said column portion is rotatable about a horizontal axis.

10. A system as claimed in claim 9, wherein said opposite surfaces of said upper portion of said coupler have defined therein a first pair of horizontal openings which are aligned with each other, said column portion has a first pair of horizontal openings which align with said first pair of horizontal openings defined in said upper portion of said coupler, and said locking means comprises a locking pin which is slidably engagable into said first pair of horizontal openings in said upper portion of said coupler and said first pair of horizontal openings in said column portion when said pairs of horizontal openings are aligned.

11. A system as claimed in claim 10, wherein:

said column portion comprises a pair of horizontal positioning pins and has defined therein a pair of slotted openings having first and second ends;

said opposite surfaces of said upper portion of said coupler have defined therein a pair of vertically slotted openings, further comprise positioning means including a pair of detent surfaces, said vertically slotted openings being accessible from said open side of said recess for receiving said horizontal positioning pins, and further have defined therein a second pair of horizontal openings below said slotted openings which align with said pair of slotted openings in said column portion;

and said system further comprises a removable cross member which engages said slotted openings in said column portion and said second pair of horizontal openings in said upper portion of said coupler, such that when said column portion assumes said first, upright position said cross member is located at said first ends of said slotted openings in said column portion and said positioning pins are engaged with said slotted openings, and when said column portion assumes second, forwardly rotated position, said cross member is located at said second end of said slotted openings in said column portion and said positioning pins are held at said detent surfaces.

* * * * *